US010765115B2

(12) United States Patent
Iyasu et al.

(10) Patent No.: US 10,765,115 B2
(45) Date of Patent: Sep. 8, 2020

(54) METHOD FOR SUPPRESSING REDUCTION OF ISOTHIAZOLINE COMPOUND CONCENTRATION

(71) Applicant: KURITA WATER INDUSTRIES LTD., Nakano-ku (JP)

(72) Inventors: Takashi Iyasu, Saitama (JP); Yasushi Murano, Kuki (JP); Toshimasa Kato, Isehara (JP)

(73) Assignee: KURITA WATER INDUSTRIES LTD., Nakano-ku (JP)

( * ) Notice: Subject to any disclaimer, the term of this patent is extended or adjusted under 35 U.S.C. 154(b) by 143 days.

(21) Appl. No.: 15/773,623

(22) PCT Filed: Mar. 28, 2016

(86) PCT No.: PCT/JP2016/059837
§ 371 (c)(1),
(2) Date: May 4, 2018

(87) PCT Pub. No.: WO2017/081875
PCT Pub. Date: May 18, 2017

(65) Prior Publication Data
US 2019/0059380 A1 Feb. 28, 2019

(30) Foreign Application Priority Data

Nov. 9, 2015 (JP) ................................. 2015-219619

(51) Int. Cl.
*A01N 25/22* (2006.01)
*A01N 43/80* (2006.01)
*C02F 1/44* (2006.01)
*C02F 1/50* (2006.01)
*C02F 1/76* (2006.01)

(52) U.S. Cl.
CPC ............. *A01N 43/80* (2013.01); *A01N 25/22* (2013.01); *C02F 1/50* (2013.01); *C02F 1/76* (2013.01); *C02F 1/441* (2013.01); *C02F 2303/04* (2013.01)

(58) Field of Classification Search
CPC ........... A01N 43/80; A01N 25/22; C02F 1/50; C02F 1/76; C02F 1/441; C02F 2303/04
See application file for complete search history.

(56) References Cited

U.S. PATENT DOCUMENTS

| 4,295,932 A * | 10/1981 | Pocius | A01N 59/00 162/161 |
|---|---|---|---|
| 5,324,432 A * | 6/1994 | Robertson | C02F 1/50 162/161 |
| 5,922,745 A | 7/1999 | McCarthy et al. | |
| 6,008,238 A | 12/1999 | El A'mma et al. | |
| 2006/0003023 A1 | 1/2006 | Williams | |
| 2013/0280349 A1* | 10/2013 | Kimler | A01N 59/00 424/723 |
| 2016/0289102 A1* | 10/2016 | Morita | C02F 1/50 |

FOREIGN PATENT DOCUMENTS

| EP | 0 913 090 A1 | 5/1999 |
| JP | 2006-22097 A | 1/2006 |
| JP | 2009-195822 A | 9/2009 |
| JP | 2011-212522 A | 10/2011 |
| JP | 2015-63475 A | 4/2015 |
| JP | 2015-117216 A | 6/2015 |
| WO | WO-2015046016 A1 * | 4/2015 |

OTHER PUBLICATIONS

Extended European Search Report dated Apr. 26, 2019 in corresponding European Patent Application No. 16863839.3, 7 pages.
International Search Report dated Jun. 21, 2016 in PCT/JP2016/059837 filed Mar. 28, 2016.
Office Action dated Apr. 9, 2020 in Chinese Patent Application No. 201680064541.8 citing document AX therein, 8 pages.
Zhengli Zhou et al, "Sewage Treatment Agents and Sewage Monitoring Technology", China Building Materials Press with English translation.
Office Action dated Apr. 27, 2020 in corresponding Indian Patent Application No. 201847317092 filed May 7, 2018 with Engiish transiation citing document AA therein, 6 pages.

* cited by examiner

Primary Examiner — Lucas A Stelling
(74) Attorney, Agent, or Firm — Oblon, McClelland, Maier & Neustadt, L.L.P.

(57) ABSTRACT

The present invention provides a method for suppressing a decrease in the concentration of an isothiazoline compound, wherein even if an addition concentration of the isothiazoline compound used as an antibacterial agent is low in a water system, the decrease in the concentration thereof can be suppressed so that the residual rate thereof after 24 hours can be raised. The method is carried out in a manner wherein to a water system, an isothiazoline compound is fed with an addition concentration of 0.2 mg/L or more and less than 1 mg/L, and a combined chlorine agent consisting of a chlorine stabilizer and a chlorine-based oxidant is added so as to maintain a concentration thereof at 0.3 mg/L as $Cl_2$ or more and 6 mg/L as $Cl_2$ or less therein.

10 Claims, No Drawings

METHOD FOR SUPPRESSING REDUCTION OF ISOTHIAZOLINE COMPOUND CONCENTRATION

TECHNICAL FIELD

The present invention relates to a water-treatment technology in the system such as a cooling water system, a water treating system with a reverse osmosis membrane (hereinafter, this is simply referred to as a RO water system), a paper pulp process water system, and a scrubber water system; in particular, to a method for suppressing a decrease in concentration of an isothiazoline compound wherein the method is considered to be effective to suppress adhesion of a biofilm owing to an antibacterial activity thereof.

BACKGROUND ART

Among isothiazoline compounds, in the past 2-methyl-4-isothiazoline-3-one (hereinafter, sometimes this is simply referred to as MIT) and 5-chloro-2-methyl-4-isothiazoline-3-one (hereinafter, sometimes this is simply referred to as Cl-MIT) have been used as an antiseptic agent, a bactericide, and an antibacterial agent. In water treatment, too, it has been known that these compounds are excellent in an antibacterial activity to microorganisms included in water, and also have an effect to suppress adhesion of a biofilm; and thus, various proposals have been made with regard to the use of the isothiazoline compound as an antibacterial agent (bactericide), etc.

For example, in PTL 1, an antibacterial composition including a composition formed of MIT, Cl-MIT, a stabilized hypochlorite salt, and a bromide is disclosed.

In PTL 2, it is described that when algae are generated in a cooling water system under an antibacterial treatment by using chlorosulfamic acid and/or a salt thereof, an isothiazolone compound (isothiazoline compound) is added therein.

CITATION LIST

Patent Literature

PTL 1: JP 2006-22097 A
PTL 2: JP 2015-63475 A

SUMMARY OF INVENTION

Technical Problem

In the antibacterial composition described in PTL 1, it is claimed that an antibacterial effect of MIT or Cl-MIT is enhanced when it is combined with a stabilized hypochlorite salt added with a bromide source. However, the bromide as mentioned above is readily volatilized so that it is difficult to maintain the composition of chemical components therein when this bromide is added to the chemicals; on the other hand, a possible countermeasure to it by previously adding a large quantity thereof or the like can lead to increase in the chemical cost. In addition, it is not clear how much of the isothiazoline compound remains after 24 hours in the water system added with it.

On the other hand, the method described in PTL 2 is a sterilizing method of algae, wherein an isothiazoline compound is further added in order to remove algae by effectively sterilizing those algae that are generated in a cooling water system. Specifically, described therein is only an example in which a decrease in algae is recognized 3 days after addition of 2 mg/L or more of Cl-MIT; and thus, in order to sterilize the algae, more amount of the isothiazoline compound needs to be added. In addition, neither the durability of the antibacterial activity nor the residual rate of the isothiazoline compound is clear.

The isothiazoline compound can maintain an excellent effect to suppress adhesion of a biofilm, when concentration of an active ingredient in an aqueous system is kept sufficiently well. However, in an actual water system, the isothiazoline compound added therein is rapidly exhausted. In the case that the isothiazoline compound is added with a low concentration, especially when the concentration thereof is limited to less than 1 mg/L, it has been difficult to maintain sufficient quantity thereof so as to sustain the effect to suppress adhesion of a biofilm after 24 hours without additional feed thereof.

The present invention was made in order to solve the problem as mentioned above. An object thereof is to provide a method for suppressing a decrease in the concentration of an isothiazoline compound, wherein even if an addition concentration of the isothiazoline compound used as an antibacterial agent is low in a water system, a decrease in the concentration thereof can be suppressed so that the residual rate thereof after 24 hours can be raised.

Solution to Problem

The present invention is based on the finding that when an isothiazoline compound and a combined chlorine agent were caused to coexist with respective given concentrations in a water system, a decrease in concentration of the isothiazoline compound with time could be suppressed.

Namely, the present invention provides following [1] to [6].

[1] A method for suppressing a decrease in concentration of an isothiazoline compound, wherein to a water system, the isothiazoline compound is fed with an addition concentration of 0.2 mg/L or more and less than 1 mg/L, and a combined chlorine agent consisting of a chlorine stabilizer and a chlorine-based oxidant is added so as to maintain a concentration thereof at 0.3 mg/L as $Cl_2$ or more and 6 mg/L as $Cl_2$ or less therein.

[2] A method for suppressing a decrease in concentration of an isothiazoline compound, wherein into a water system in which a combined chlorine agent consisting of a chlorine stabilizer and a chlorine-based oxidant is included with a concentration thereof of 0.3 mg/L as $Cl_2$ or more and 6 mg/L as $Cl_2$ or less, an isothiazoline compound is fed with an addition concentration of 0.2 mg/L or more and less than 1 mg/L.

[3] The method for suppressing the decrease in concentration of the isothiazoline compound according to [1] or [2], wherein the isothiazoline compound is at least one compound selected from the group consisting of 5-chloro-2-methyl-4-isothiazoline-3-one, 2-methyl-4-isothiazoline-3-one, 4,5-dichloro-2-methyl-4-isothiazoline-3-one, 2-ethyl-4-isothiazoline-3-one, 2-n-octyl-4-isothiazoline-3-one, 5-chloro-2-ethyl-4-isothiazoline-3-one, 5-chloro-2-t-octyl-4-isothiazoline-3-one, 4,5-dichloro-2-n-octyl-4-isothiazoline-3-one, 4,5-dichloro-2-cyclohexyl-4-isothiazoline-3-one, and 1,2-benzoisothiazoline-3-one.

[4] The method for suppressing the decrease in concentration of the isothiazoline compound according to any one of [1] to [3], wherein the chlorine stabilizer is at least one compound selected from the group consisting of sulfamic acid and derivatives thereof.

[5] The method for suppressing the decrease in concentration of the isothiazoline compound according to any one of [1] to [4], wherein the chlorine-based oxidant is a hypochlorite salt.

[6] The method for suppressing the decrease in concentration of the isothiazoline compound according to any one of [1] to [5], wherein the water system is an open circulation cooling water system or a membrane concentrating water system.

Advantageous Effects of Invention

According to the present invention, in a water system, a decrease in concentration of the isothiazoline compound with time can be suppressed.

Therefore, according to the present invention, in a water system, the isothiazoline compound can raise a residual rate after 24 hours even if the addition concentration thereof is low, so that durability of the effect to suppress adhesion of a biofilm due to its antibacterial activity can be enhanced, thereby especially in an antibacterial action to microorganisms included in water such as legionella bacteria, excellent durable effect can be expressed. Therefore, the present invention also has the advantage of cost reduction in water treatment because a use amount of the isothiazoline compound as an antibacterial agent can be reduced.

DESCRIPTION OF EMBODIMENTS

Method of First Embodiment

The first embodiment of the method for suppressing a decrease in concentration of the isothiazoline compound in the present invention is characterized by that to a water system, the isothiazoline compound is fed with an addition concentration of 0.2 mg/L or more and less than 1 mg/L, and a combined chlorine agent consisting of a chlorine stabilizer and a chlorine-based oxidant is added so as to maintain a concentration thereof at 0.3 mg/L as $Cl_2$ or more and 6 mg/L as $Cl_2$ or less therein.

By causing the isothiazoline compound and the combined chlorine agent to coexist with the respective given concentrations in a water system, the change in concentration of the combined chlorine agent with time is not affected by coexistence of the isothiazoline compound, and also the decrease in concentration of the isothiazoline compound with time can be suppressed.

(Water System)

The method of the present invention is used in a water system. Specifically, the method can be suitably used in a general industrial water system in which suppressing adhesion of a biofilm is required, namely, in the water system such as a cooling water system, a RO water system, a water system for paper pulp process, and a scrubber water system, wherein particularly suitable, useful systems are an open circulation cooling water system and a membrane concentrating water system.

Meanwhile, with regard to a water quality to be covered herein, this method is suitably used in a water system in which a growth of bacteria, such as legionella bacteria and zoogloea-like bacteria, is required to be suppressed.

(Isothiazoline Compound)

The isothiazoline compound is a compound having a 5-membered heterocycle in which a nitrogen atom and a sulfur atom are included; and as mentioned above, this compound is excellent in the antibacterial activity to microorganisms included in water thereby having an effect of suppressing adhesion of a biofilm. Specific example thereof includes 5-chloro-2-methyl-4-isothiazoline-3-one (Cl-MIT), 2-methyl-4-isothiazoline-3-one (MIT), 4,5-dichloro-2-methyl-4-isothiazoline-3-one, 2-ethyl-4-isothiazoline-3-one, 2-n-octyl-4-isothiazoline-3-one, 5-chloro-2-ethyl-4-isothiazoline-3-one, 5-chloro-2-t-octyl-4-isothiazoline-3-one, 4,5-dichloro-2-n-octyl-4-isothiazoline-3-one, 4,5-dichloro-2-cyclohexyl-4-isothiazoline-3-one, and 1,2-benzoisothiazoline-3-one. These isothiazoline compounds may be used singly, or two or more of them may be used concurrently. Among them, Cl-MIT and MIT are preferable, while Cl-MIT is more preferable.

<Addition Concentration>

Addition concentration (feeding concentration) of the isothiazoline compound is 0.2 mg/L or more and less than 1 mg/L, while preferably in the range of 0.2 to 0.5 mg/L. When the addition concentration is less than 0.2 mg/L, the residual rate after 24 hours is too low. On the other hand, when the addition concentration is 1 mg/L or more, sufficient residual rate can be obtained regardless of addition concentration of the combined chlorine agent; and thus, in view of enhancement effect to the residual rate in a low addition concentration, an upper limit of the addition concentration is set to less than 1 mg/L in the present invention.

Meanwhile, concentration of the isothiazoline compound in the water system of the present invention is the value obtained by measurement with a liquid chromatography analysis method (LC-MS).

The residual rate of the isothiazoline compound after 24 hours since the addition thereof into the water system is preferably 5% or more, while more preferably 15% or more.

(Combined Chlorine Agent)

The combined chlorine agent is a reaction product formed of a chlorine stabilizer and a chlorine-based oxidant. This may be added as a one-component type in a state of the reaction product, or may also be added as a two-component type of a mixture of the chlorine stabilizer and the chlorine-based oxidant. Among them, suitably used therein is monochlorosulfamic acid which is a reaction product of sulfamic acid as the chlorine stabilizer with a hypochlorite salt such as sodium hypochlorite, potassium hypochlorite, or calcium hypochlorite, or with chlorinated isocyanuric acid, as the chlorine-based oxidant.

<Chlorine Stabilizer>

The chlorine stabilizer generates a stabilized chlorine component (combined chlorine agent) by reaction with the chlorine-based oxidant. Specific example thereof includes sulfamic acid or derivatives thereof; hydantoins such as 5,5'-dimethylhydantoin; isocyanuric acid; urea; biuret; methyl carbamate; ethyl carbamate; amide compounds such as acetamide, nicotinic acid amide, methane sulfonamide, and toluene sulfonamide; imide compounds such as maleimide, succinic acid imide, and phthalimide; amino acids such as glycine, alanine, histidine, and lysine; amines such as methylamine, hydroxylamine, morpholine, piperazine, imidazole, and histamine; ammonia; and ammonium salts such as ammonium sulfate. These may be used singly, or two or more of them may be used concurrently. Among them, sulfamic acid is especially preferable.

Specific example of the sulfamic acid derivative includes N-methyl sulfamic acid, N,N-dimethyl sulfamic acid, N-phenyl sulfamic acid, and salts of them.

Specific example of the sulfamic acid salt includes sodium sulfamate, potassium sulfamate, calcium sulfamate, strontium sulfamate, barium sulfamate, iron sulfamate, zinc sulfamate, and ammonium sulfamate.

Use amount of the chlorine stabilizer is, in view of sufficient reactivity with the chlorine-based oxidant, preferably 1 to 5 times by mole relative to the chlorine-based oxidant. The use amount thereof is more preferably 1 to 4 times by mole, while still more preferably 1.2 to 3 times by mole.

<Chlorine-Based Oxidant>

The chlorine-based oxidant generates the stabilized chlorine component (combined chlorine agent) by a reaction with the chlorine stabilizer. Specific example thereof includes chlorine gas, chlorine dioxide, as well as hypochlorous acid, chlorous acid, chloric acid, perchloric acid, chlorinated isocyanuric acid, and salts of them. These may be used singly, or two or more of them may be used concurrently. Among them, hypochlorous acid or a salt thereof, or chlorinated isocyanuric acid is preferably used, while a hypochlorite salt is more preferably used. The hypochlorite salt is not particularly restricted, while illustrative example thereof includes sodium hypochlorite, potassium hypochlorite, calcium hypochlorite, and barium hypochlorite. Among them, in view of availability and so on, sodium hypochlorite is suitably used.

<Addition Concentration>

The addition concentration (holding concentration) of the combined chlorine agent is 0.3 mg/L as $Cl_2$ or more and 6 mg/L as $Cl_2$ or less, while preferably in the range of 1 to 5 mg/L as $Cl_2$. When the addition concentration is less than 0.3 mg/L as $Cl_2$, the decrease in the concentration of the isothiazoline compound cannot be adequately suppressed so that the residual rate of the isothiazoline compound significantly decreases. When the addition concentration is more than 6 mg/L as $Cl_2$, the residual rate of the isothiazoline compound significantly decreases either.

Meanwhile, the concentration as $Cl_2$ of the combined chlorine agent in the water system of the present invention is the value measured with a residual chlorine measurement instrument manufactured by HACH Company using a dedicated reagent for it.

(Addition (Feeding) Method)

In the method of the first embodiment of the present invention, in the water system, so far as the isothiazoline compound is within the aforementioned given range of the addition concentration, and also the combined chlorine agent is kept within the afore-mentioned given range of the addition concentration, the addition methods of them are not particularly restricted. The isothiazoline compound and the combined chlorine agent each may be added as a solid or as an aqueous solution having the concentration thereof arbitrarily adjusted. Further, they may be added separately or as a mixture of them. When the isothiazoline compound and the combined chlorine agent each are added separately, they may be added simultaneously, or any one of them may be added first. In addition, they may be added continuously or intermittently.

Specifically, for example, in the case of the open circulation cooling water system, a preferable way to carry out the method is as follows. Namely, with always measuring concentrations of the isothiazoline compound and the combined chlorine agent in blowing water, an aqueous solution of the isothiazoline compound and an aqueous solution of the combined chlorine agent each are added into a pit of the cooling water by using a device capable of feeding automatically and continuously so as to maintain these measurement values within the respective given concentration ranges.

Meanwhile, in the method of the present invention, so far as the effect of suppressing the decrease in concentration of the isothiazoline compound is not hindered, an additive other than the isothiazoline compound and the combined chlorine agent may be added into a water system, in accordance with the purpose of the water treatment. Illustrative example of the additive as an arbitrary component includes an antiseptic agent, an anti-scaling agent, an anti-corrosive agent, a releasing agent, and an anti-foaming agent. The addition method of these additives is not particularly restricted either, thereby they may be added as a mixture with the isothiazoline compound and/or the combined chlorine agent, or separately therefrom.

Method of Second Embodiment

The second embodiment of the method for suppressing a decrease in concentration of the isothiazoline compound in the present invention is as follows. Namely, into a water system in which the combined chlorine agent consisting of the chlorine stabilizer and the chlorine-based oxidant is included with a concentration thereof of 0.3 mg/L as $Cl_2$ or more and 6 mg/L as $Cl_2$ or less, the isothiazoline compound is fed with the addition concentration of 0.2 mg/L or more and less than 1 mg/L.

Alternatively, to the water system which includes the combined chlorine agent with the given concentration as mentioned above, the isothiazoline compound may be fed so as to bring the concentration thereof to the given concentration. In this way, too, the same effects as the method of the first embodiment can be obtained.

Explanation with regard to details of the method of the second embodiment is omitted because the items other than the addition method are the same as those explained in the method of the first embodiment. Meanwhile, in the method of the second embodiment, the addition concentration (holding concentration) of the combined chlorine agent mentioned above corresponds to the concentration of the combined chlorine agent included therein.

(Addition Method)

In the method of the second embodiment of the present invention, the addition method of the isothiazoline compound is not particularly restricted so far as merely the isothiazoline compound with the addition concentration thereof in the foregoing given range is fed into the water system in which the combined chlorine agent is included with the given concentration. The isothiazoline compound may be added as a solid or as an aqueous solution having the concentration thereof arbitrarily adjusted. Further, it may be added continuously or intermittently.

Specifically, for example, in the case of the open circulation cooling water system, a preferable way to carry out the method is as follows. Namely, with always measuring the concentration of the isothiazoline compound in blowing water, an aqueous solution of the isothiazoline compound is added into a pit of the cooling water by using a device capable of feeding automatically and continuously so as to maintain this measurement value within the foregoing given concentration range.

EXAMPLES

Hereunder, the present invention will be explained in more detail; however, the present invention is not restricted by Examples described below.

[Confirmation Test of Residual Rate of Isothiazoline Compound]

Into a 100-mL glass bottle with a screw cap was taken 50 mL of a test solution whose pH was adjusted to 7.0 by a phosphate buffer solution, and then, with simulating an actual cooling water system, legionella bacteria was added into it as microorganism in such a manner that initial number of the bacteria was $10^7$ CFU/100 mL. Into this test water were added Cl-MIT as the isothiazoline compound and monochlorosulfamic acid as the combined chlorine agent with respective addition concentrations (concentration as $Cl_2$ in the case of the combined chlorine agent) shown in Table 1 below. Stationary culture thereof was carried out while the temperature therein was kept at 36° C.

The residual concentration of Cl-MIT after 24 hours was measured to obtain the residual rate thereof (=residual concentration/addition concentration).

Meanwhile, concentration of Cl-MIT was measured with a liquid chromatography analysis method (LC-MS) (lower detection limit: 0.1 ppb). The concentration as $Cl_2$ (this is described as "$Cl_2$" in Table 1) of monochlorosulfamic acid was measured with a residual chlorine measurement instrument manufactured by HACH Company using a dedicated reagent for it.

Number of legionella bacteria after 24 hours was analyzed by the refrigerated centrifuge concentration method described in "Newly Revised Guideline for Protection of Legionella Disease" (published by Building Management Education Center Foundation, pp. 88-89, 1999), thereby the sterilizing rate thereof was obtained.

TABLE 1

| Sample | Addition concentration Cl-MIT (mg/L) | Addition concentration $Cl_2$ (mg/L) | Residual concentration Cl-MIT (µg/L) | Residual concentration $Cl_2$ (mg/L) | Cl-MIT residual rate (%) | Sterilizing rate (%) |
|---|---|---|---|---|---|---|
| 1  | 0.1 | 1   | 0.3    | 0   | 0.3  | 80  |
| 2  | 0.1 | 1.5 | 1.2    | 0.6 | 1.2  | 88  |
| 3  | 0.1 | 3   | 0.1    | 2.1 | 0.1  | 67  |
| 4  | 0.1 | 5   | 0.2    | 3.8 | 0.2  | 99  |
| 5  | 0.2 | 1   | 48.0   | 0.5 | 24.0 | 100 |
| 6  | 0.2 | 5   | 34.0   | 3.7 | 17.0 | 100 |
| 7  | 0.3 | 1   | 71.6   | 0.3 | 23.9 | 100 |
| 8  | 0.3 | 1.5 | 112.6  | 0.7 | 37.5 | 100 |
| 9  | 0.3 | 3   | 46.8   | 1.4 | 15.6 | 100 |
| 10 | 0.3 | 5   | 44.9   | 3.7 | 15.0 | 100 |
| 11 | 0.5 | 0   | 2.1    | 0   | 0.4  | 100 |
| 12 | 0.5 | 1   | 270.6  | 0.3 | 54.1 | 100 |
| 13 | 0.5 | 1.5 | 336.9  | 0.8 | 67.4 | 100 |
| 14 | 0.5 | 3   | 181.8  | 1.8 | 36.4 | 100 |
| 15 | 0.5 | 5   | 116.2  | 3.6 | 23.2 | 100 |
| 16 | 0.5 | 8   | 3.0    | 8.0 | 0.6  | 100 |
| 17 | 1.0 | 0   | 600.0  | 0   | 60.0 | 100 |
| 18 | 1.0 | 3   | 600.0  | 2.7 | 60.0 | 100 |
| 19 | 2.0 | 0   | 1500.0 | 0   | 75.0 | 100 |

As can been seen from the results in Table 1, when the addition concentration of Cl-MIT was 0.1 mg/L (Samples 1 to 4), the bacteria were not completely sterilized. Moreover, regardless of the addition concentration of monochlorosulfamic acid, almost all of Cl-MIT was lost, as can be seen that the residual rate thereof was less than 2% in all of them.

Also, even if the addition concentration of Cl-MIT was 0.5 mg/L, when monochlorosulfamic acid was not added or the addition concentration thereof was 8 mg/L as $Cl_2$ (Samples 11 and 16), almost all of Cl-MIT was lost, as can be seen that the residual rate thereof was less than 1% in all of them.

Comparing with these, when the addition concentration of Cl-MIT was 0.2 mg/L or more and less than 1 mg/L and the addition concentration of monochlorosulfamic acid was 0.3 mg/L as $Cl_2$ or more and 6 mg/L as $Cl_2$ or less (Samples 5 to 10 and 12 to 15), it was recognized that the residual rate of Cl-MIT was as high as 15% or more. In addition, it was confirmed that the change in concentration of monochlorosulfamic acid with time was not affected by the addition concentration of Cl-MIT.

Meanwhile, when the addition concentration of Cl-MIT was as high as 1.0 mg/L or more (Samples 17 to 19), the residual rate of Cl-MIT was high regardless of the addition concentration of monochlorosulfamic acid.

[Test with Actual Equipment]

Example 1

By using the open circulation cooling water tower, when the operation was carried out with the operation condition shown below, under the condition that the concentration of Cl-MIT in the blowing water was 0.5 mg/L (within ±10%) and the concentration of monochlorosulfamic acid in the blowing water was 5 mg/L (within ±10%) as $Cl_2$ (this example corresponds to Sample 15 in the confirmation test mentioned above), total use amount of Cl-MIT was 48 g.

Meanwhile, the number of legionella bacteria in the blowing water at the time of termination of the operation was less than 10 CFU/100 mL.

<Operation Condition>
Circulating water amount: 62 m³/hour
Holding water amount: 0.5 m³
Blowing water amount: 0.13 m³/hour
Replenishing water amount: 0.66 m³/hour
pH of replenishing water pH: 7.0
Number of legionella bacteria in circulating water: 3.1× $10^3$ CFU/100 mL
Operation time: 1 month
Addition site of Cl-MIT and monochlorosulfamic acid: cooling water pit Comparative Example 1

When operation was carried out with the same operation condition as Example 1 except that in Example 1 the concentration of Cl-MIT in the blowing water was kept so as to be at 1.0 mg/L (within ±10%) and the concentration of monochlorosulfamic acid in the blowing water as the $Cl_2$-conversion rate was kept so as to be at 3 mg/L (within ±10%) (this example corresponds to Sample 18 in the confirmation test mentioned above), total use amount of Cl-MIT was 96 g.

Meanwhile, the number of legionella bacteria in the blowing water at the time of termination of the operation was less than 10 CFU/100 mL.

From the results of Example 1 and Comparative Example 1, according to the present invention, in the case when the continuous operations are carried out in the open circulation cooling water system for the same period, it can be said that the total use amount of Cl-MIT to obtain an antibacterial activity can be reduced.

The invention claimed is:

1. A method for suppressing a decrease in concentration of an isothiazoline compound, the method comprising:
feeding an isothiazoline compound to a water system, with an addition concentration of 0.2 mg/L or more and less than 1 mg/L; and
adding a combined chlorine agent consisting of a chlorine stabilizer and a chlorine-based oxidant to the water system, so as to maintain a concentration of the combined chlorine agent in the water system at 0.3 mg/L as $Cl_2$ or more and 6 mg/L as $Cl_2$ or less;

wherein a residual concentration of the isothiazoline compound after 24 hours is 15% or more.

2. The method according to claim 1, wherein the isothiazoline compound is at least one selected from the group consisting of 5-chloro-2-methyl-4-isothiazoline-3-one, 2-methyl-4-isothiazoline-3-one, 4,5-dichloro-2-methyl-4-isothiazoline-3-one, 2-ethyl-4-isothiazoline-3-one, 2-n-octyl-4-isothiazoline-3-one, 5-chloro-2-ethyl-4-isothiazoline-3-one, 5-chloro-2-t-octyl-4-isothiazoline-3-one, 4,5-dichloro-2-n-octyl-4-isothiazoline-3-one, 4,5-dichloro-2-cyclohexyl-4-isothiazoline-3-one, and 1,2-benzoisothiazoline-3-one.

3. The method according to claim 1, wherein the chlorine stabilizer is at least one selected from the group consisting of sulfamic acid and derivatives thereof.

4. The method according to claim 1, wherein the chlorine-based oxidant is a hypochlorite salt.

5. The method according to claim 1, wherein the water system is an open circulation cooling water system or a membrane concentrating water system.

6. A method for suppressing a decrease in concentration of an isothiazoline compound, the method comprising feeding an isothiazoline compound into a water system comprising a combined chlorine agent consisting of a chlorine stabilizer and a chlorine-based oxidant,
wherein:
a concentration of the combined chlorine agent in the water system is 0.3 mg/L as $Cl_2$ or more and 6 mg/L as $Cl_2$ or less;
the isothiazoline compound is fed into the water system with an addition concentration of 0.2 mg/L or more and less than 1 mg/L; and
a residual concentration of the isothiazoline compound after 24 hours is 15% or more.

7. The method according to claim 6, wherein the isothiazoline compound is at least one selected from the group consisting of 5-chloro-2-methyl-4-isothiazoline-3-one, 2-methyl-4-isothiazoline-3-one, 4,5-dichloro-2-methyl-4-isothiazoline-3-one, 2-ethyl-4-isothiazoline-3-one, 2-n-octyl-4-isothiazoline-3-one, 5-chloro-2-ethyl-4-isothiazoline-3-one, 5-chloro-2-t-octyl-4-isothiazoline-3-one, 4,5-dichloro-2-n-octyl-4-isothiazoline-3-one, 4,5-dichloro-2-cyclohexyl-4-isothiazoline-3-one, and 1,2-benzoisothiazoline-3-one.

8. The method according to claim 6, wherein the chlorine stabilizer is at least one selected from the group consisting of sulfamic acid and derivatives thereof.

9. The method according to claim 6, wherein the chlorine-based oxidant is a hypochlorite salt.

10. The method according to claim 6, wherein the water system is an open circulation cooling water system or a membrane concentrating water system.

* * * * *